United States Patent [19]

Carnes, Jr.

[11] 3,922,557

[45] Nov. 25, 1975

[54] APPARATUS FOR THE OPTICAL EXAMINATION OF ARTICLES

[75] Inventor: W. Robert Carnes, Jr., Darien, Conn.

[73] Assignee: Pitney-Bowes, Inc., Stamford, Conn.

[22] Filed: Apr. 2, 1974

[21] Appl. No.: 457,388

[52] U.S. Cl. ............ 250/578; 250/571; 250/223 A; 356/206; 356/209
[51] Int. Cl.² ...................................... H01J 39/12
[58] Field of Search .......... 250/216, 228, 578, 555, 250/556, 239, 571, 223 R; 356/201, 209, 206

[56] References Cited
UNITED STATES PATENTS

| | | | |
|---|---|---|---|
| 3,485,358 | 12/1969 | Hooker | 250/555 X |
| 3,561,846 | 2/1971 | Kingsland | 250/228 |
| 3,645,634 | 2/1972 | Bucher | 356/206 X |
| 3,690,773 | 9/1972 | Malley | 356/206 X |

*Primary Examiner*—Walter Stolwein
*Attorney, Agent, or Firm*—William D. Soltow, Jr.; Albert W. Scribner; Martin D. Wittstein

[57] ABSTRACT

An optical transmissivity examination apparatus is disclosed having a detector including a light reflective means and a photosensitive member positioned at a focal point of the light reflective means. A light source projects a light beam at the reflective means and a transport is provided for scanning an article by conveying the article past the light beam between the light source and the detector. The light gathering capability of the detector provides enhanced sensitivity and resolution and permits the light beam to be projected over a relatively large area of the article which, in addition to the movement of the article past the light beam, provides for scanning of a relatively large area of the article.

5 Claims, 12 Drawing Figures

APPARATUS FOR THE OPTICAL EXAMINATION OF ARTICLES

This invention relates to an optical examination apparatus. The invention relates more particularly to an improved apparatus which is adapted for detecting the transmissivity of light through a material being examined.

In a known examination procedure, a light beam is projected at one surface of a generally planar article and the level of light transmission through the article is sensed by a photodetection means which is positioned on an opposite side of the article. The light transmissivity of an article being examined can then be correlated with, and a determination made respect to, some characteristic of the article such as its thickness, color, quality, fitness and unfitness for use, etc.

In view of the fact that certain articles can exhibit small scale variations such as defects, blemishes, etc., which are generally uncharacteristic of the article as a whole, a more accurate determination is provided by examining the light transmissivity of the article over an extended area of the article rather than over a single isolated surface segment. For example, in the field of currency fitness examination, an examination and determination that a bill is fit for continued circulation can be erroneous when only a relatively small area of the bill is examined since the remainder of the bill may be unacceptably soiled.

Various arrangements are known for increasing the effective area of examination of an article. In general, an array of photodetectors or a phototube is provided and the article is scanned by conveying the article between a stationary light source and the photodetector array or phototube. Alternatively, the article is maintained stationary with respect to the photodetector array and a light beam is deflected in a scanning pattern across a surface of the article. These scanning systems however are relatively insensitive, complex, and costly and require extensive circuit means for handling the information signals generated by the array of photocells. The sensitivity is appreciably enhanced only by employing relatively expensive photomultipliers and the like.

In addition to determining a characteristic of an article by detecting the level of it's light transmissivity, it is at times desirable to distinguish different articles of a same class by sensing for variations in transmissivity which are characteristic of the different articles in a class. This is true in document sorting and in currency sorting where, for example, it is desirable to automatically sort currency of different denominations. The use of a light transmission detection arrangement for distinguishing different articles of a same class requires a light detection arrangement having a relatively high sensitivity and resolution.

Examination of articles for certain characteristics can also be accomplished with facility by sensing the reflectance of light from the article. It would be advantageous to provide a relatively non-complex apparatus which is adapted to examine an article for both light transmissivity and reflectance.

Accordingly, it is an object of this invention to provide an improved apparatus for the examination of an article by the detection of the light transmissivity of the article.

Another object of the invention is to provide an improved apparatus adapted for examining an article by detecting both the light transmissivity and reflectance of an article.

Another object of the invention is to provide an improved apparatus for examining an article by detecting the light transmissivity of the article over a relatively large surface of the article.

Another object of the invention is to provide an improved form of apparatus for examination of an article by scanning the article and detecting the light transmissivity of the article.

Another object of the invention is to provide a relatively non-complex, light transmissivity examination apparatus for examining articles over relatively large surface areas.

A further object of the invention is to provide a light transmissivity examination apparatus having increased sensitivity.

Another object of the invention is to provide a light transmissivity examination apparatus having increased resolution.

Another object of the invention is to provide an improved apparatus for detecting the light transmissivity of currency.

In accordance with the general features of this invention, an optical transmissivity examination apparatus is provided comprising a light reflective means having a focal point for intercepting light energy which is incident thereon and for reflecting the light energy toward its focal point, a photosensitive means positioned at the focal point and adapted for providing an electrical indication which is representative of the intensity of light impinging on the photosensitive means, a light source arranged for projecting a light beam at the reflective means, and a means for transporting an article in the path of the light beam between the light source and the reflective means. The intensity of light energy impinging on the photosensitive means and the magnitude of a corresponding electrical indication generated by the photosensitive means is proportional to the light transmissivity characteristic of the article. The light gathering capability of the reflective means permits the light beam to be projected at a relatively large surface area of the article, and, in addition, the transport means provides for scanning the article by transporting the article past the light beam whereby a relatively large segment of the total surface area of the article is examined.

The use of a reflective means and a photosensitive means positioned at its focal point greatly enhances the gathering of the transmitted light and results in an increased sensitivity and resolution. It has been found that with this increased sensitivity and resolution, different articles within a class of articles exhibit an identifiable signature. This signature is particularly useful for distinguishing and sorting the different articles in the class.

In accordance with other features of the invention, the apparatus includes detection means for detecting light reflectance from the surface of the article being examined.

These and other objects and features of the invention will become apparent with reference to the following specification and to the drawings wherein.

Figure 1:
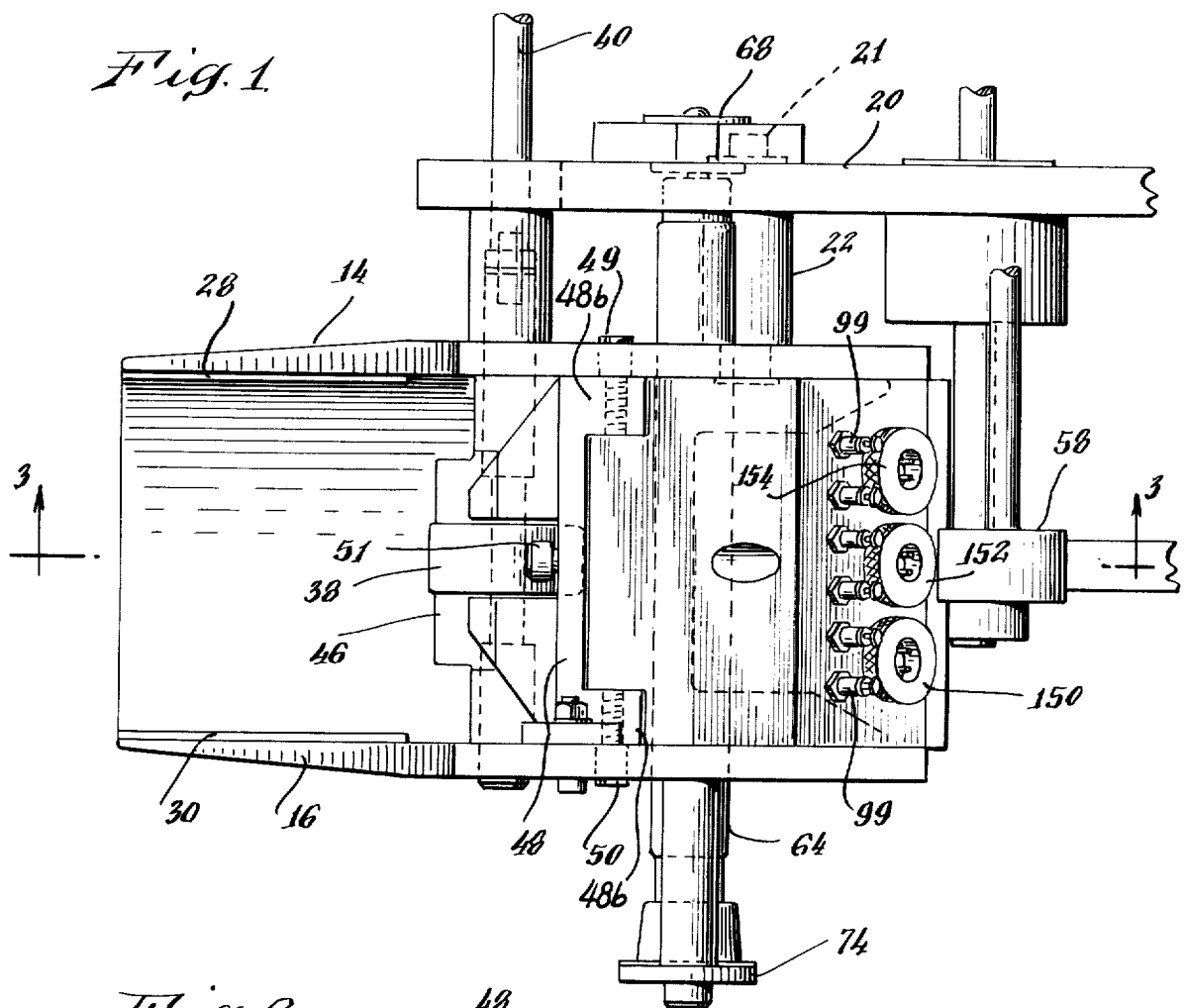
FIG. 1 is a plan view of an apparatus constructed in accordance with features of this invention.
Figure 2:
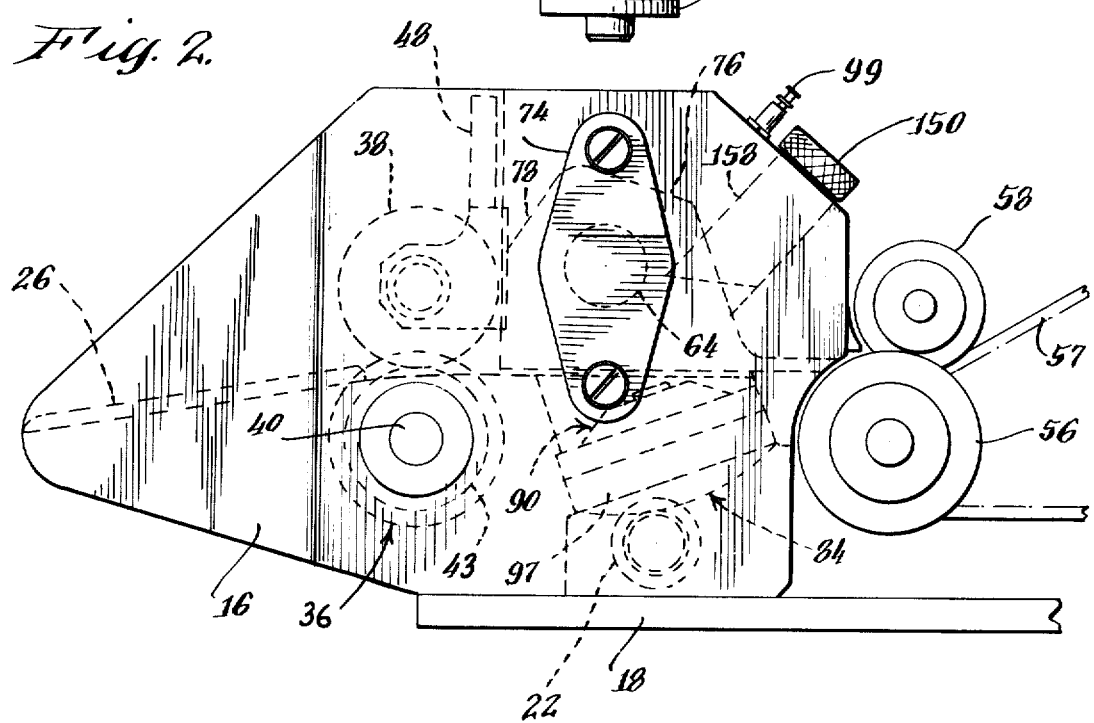
FIG. 2 is a side elevation view of the apparatus of FIG. 1.
Figure 3:
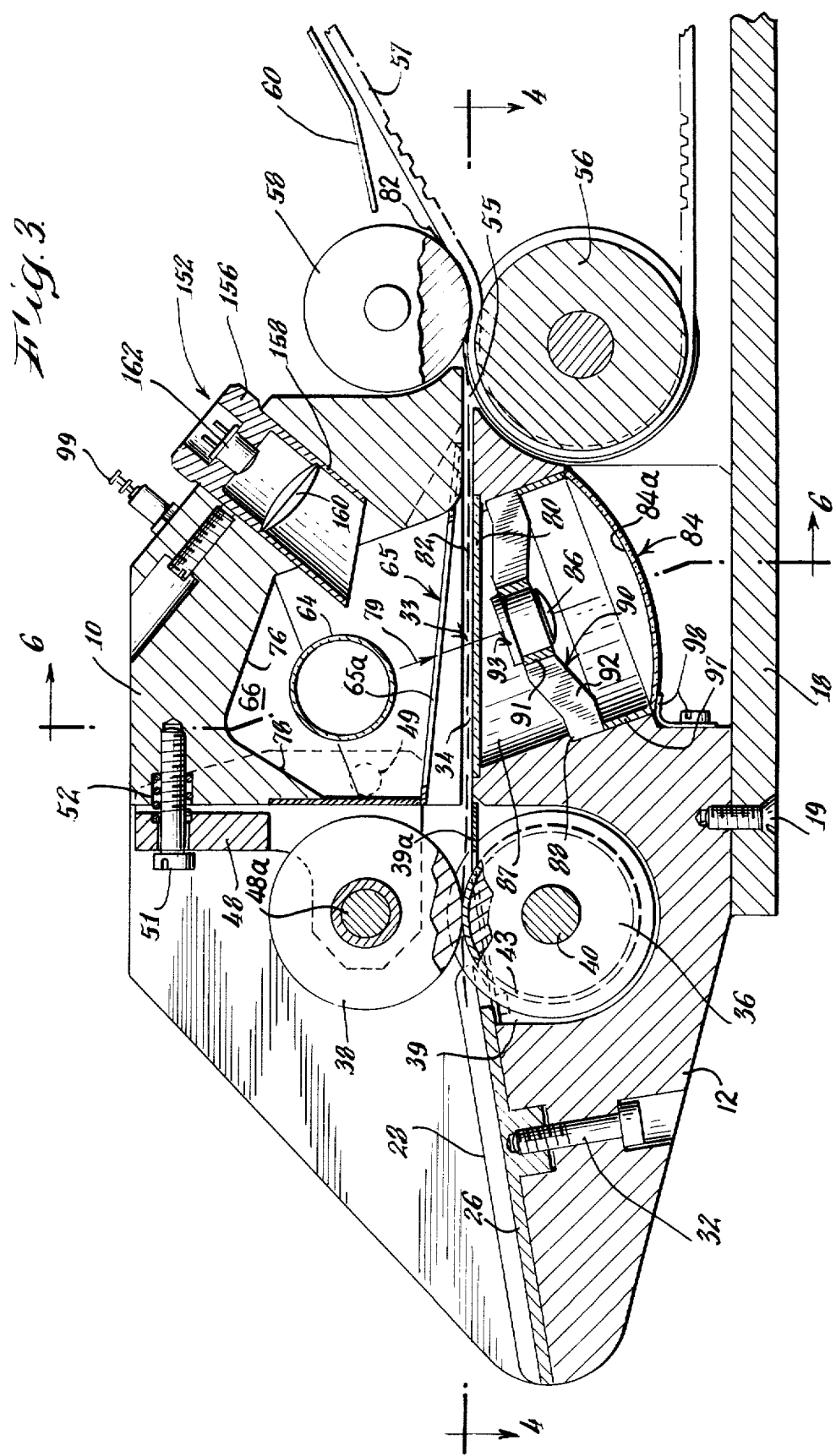
FIG. 3 is a partial sectional view taken along section line 3—3 of FIG. 1.
Figure 4:
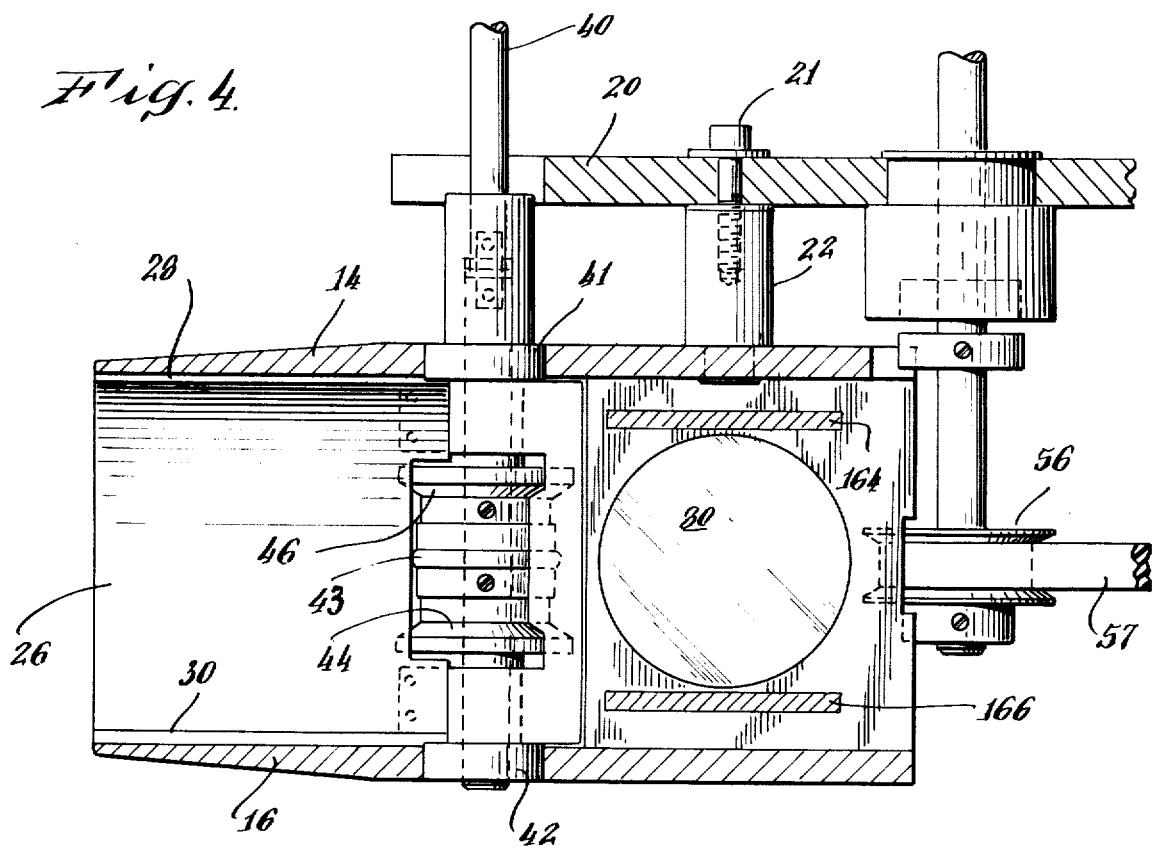
FIG. 4 is a sectional view taken along section line 4-4 of FIG. 3.
Figure 5:
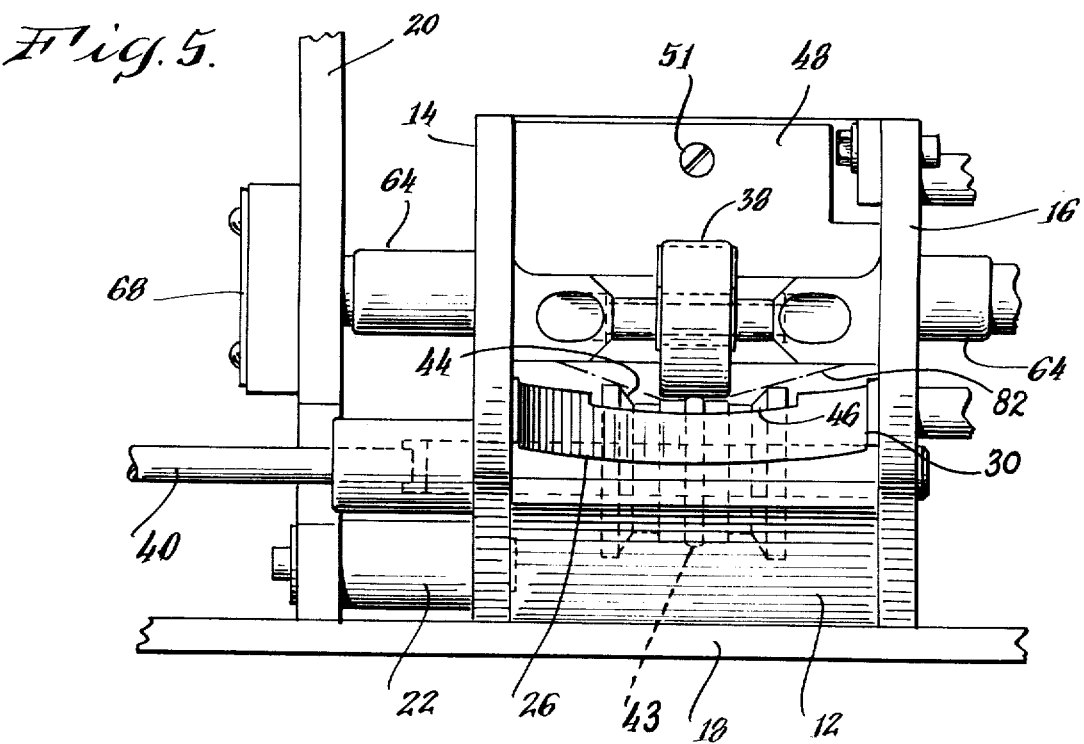
FIG. 5 is a front elevation view, partly cut away, of the apparatus of FIG. 1.

Referring now to the drawings and particularly to FIGS. 1, 2 and 3, the apparatus is shown to include a housing formed by an upper block member 10, FIG. 3, and a lower block member 12 which are secured to and between side plates 14 and 16. The upper and lower block members and side plates are secured in a rigid assembly by suitable screws not illustrated, and the assembly is secured on a base plate 18 by suitable screws as illustrated at 19 of FIG. 3. A vertically disposed plate 20 is secured to this housing assembly by any suitable means such as by screws and spacers as is illustrated at 21, 22 of FIGS. 1, 4 and 6. A guide plate 26 is mounted on the lower block member 12 by means of screw 32 FIG. 3, the longitudinally inclined upper ramp surface of this plate being slightly concave or cylindrical in shape, as seen in FIG. 5, and being formed with side guide shoulders 26, 28. As is best seen in FIG. 3 the above described arrangement affords an article examination station 33 disposed along the article feed path that is effectively defined by the relatively narrow passage 34 between the said upper and lower block members 10 and 12.

An article to be examined, such as a bill, is introduced into the apparatus by positioning the article on the ramp surface of guide plate 26 and by manually advancing the article between a drive roller 36 and a pinch roller 38. The drive roller is partly positioned in a cavity 39 in the block member 12 and is mounted on a drive shaft 40 which is supported in a suitable bearing 41, FIG. 4, in the side plate 14 and in a similar bearing 42 in the side plate 16. The drive roller 36 is rotatably coupled to shaft 40 and carries a friction drive collar 43 formed of rubber or other material suitable for frictional driving contact with the article to be transported. As illustrated in FIG. 5, the roller 36 includes beveled shoulders 44 and 46. This article feed roller arrangement coupled with the concave shape given to the upper surface of the plate 26 particularly adapts the apparatus for receiving articles, such as indicated at 82 of FIG. 5, which are partially folded along a longitudinal axis that is substantially parallel to the direction of motion of the article through the apparatus. More particularly, bills which are handled manually by workers in a currency fitness examination procedure are folded in this manner and the apparatus is adapted for efficiently receiving and transporting these bills through the apparatus.

The pinch roll 38 normally contacts the said collar 43 and is rotatably supported on a bracket 48 by means of a shaft 48a. Bracket 48 includes projecting shoulders 48b FIG. 1 which are pivotally supported on the upper block member 10 by means of suitable pivot pins 49 and 50. The bracket is biased in a counter-clockwise direction, as seen in FIG. 3, by means of a suitable spring 52 so as to urge said pinch roll 38 toward cooperative engagement with the said friction drive collar 43; this movement of the bracket being guided by a screw 51 which is secured to the block member 10 and which extends through a suitable aperture formed in the upper portion of said bracket.

Feeding a planar article such as a currency bill between the said drive and pinch rollers causes the article to be transported into said passage or channel 34, through the examination station 33 and out through an exit aperture 55. An apertured inclined guide plate 65, FIG. 3, secured to the upper block member 10 serves to guide the leading edges of articles through passage 34 and thus inhibits jamming of articles at the examination station 33. Positioned adjacent the exit aperture 55 is a suitable transport means which is adapted to be continuously driven and which may include for example a drive roller 56, with an associated transport belt 57, and a cooperating pinch roller 58. When an article leaves exit aperture 55 it is engaged and driven by and between the pinch roller 58 and belt 57 past a suitable guide 60 and on to a downstream processing station. Articles to be examined in the instant apparatus are required to be of sufficient length so that driving contact with the leading edge of an article, such as 82 of FIG. 3, is established by the transport means 57, 58 before the trailing edge of the same article leaves driving contact with cooperating rollers 36 and 38.

Figure 6:
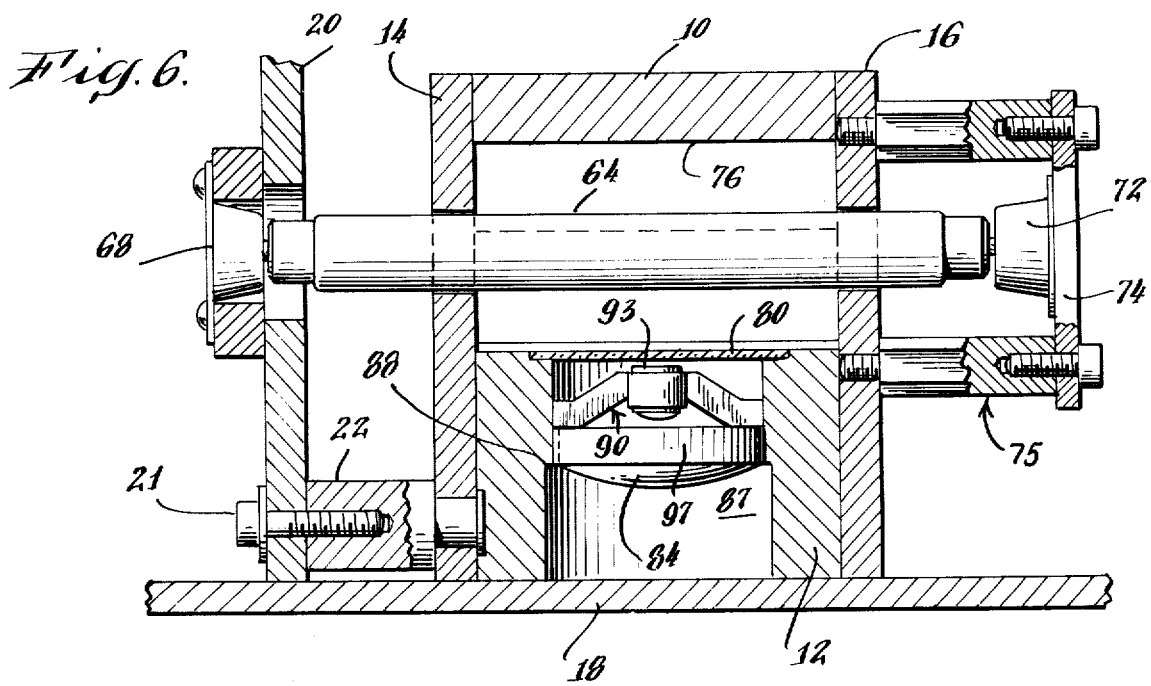
FIG. 6 is a sectional view taken along section line 6-6 of FIG. 3.

A means is provided for detecting the light transmissivity of an article being transported through the examination station 33. This means includes a light source for projecting a light beam at a relatively large surface area of the article. A means is also provided for gathering or optically integrating that light which is transmitted through the article and for providing an electrical output signal having an amplitude which is representative of the optical integration of the transmitted light. The light source as best seen in FIGS. 3 and 6 comprises a lamp 64 which is mounted in socket members 68 and 72 and extends through suitable apertures formed in the plates 14, 16 and 20 respectively and through a cavity 66 formed in the upper block member 10. The socket member 68 is mounted on the said plate 20 while the socket member 72 is mounted on a fixed offset plate 74 that is spaced from and secured to the said side plate 16 by any suitable fastening means 75. Electrical energy is supplied between the socket members for energizing the lamp 64, the latter comprising a fluorescent lamp which can exhibit particular spectrum characteristics. When examining currency, it is preferable to utilize a lamp which exhibits a predominant output in the blue portion of the color spectrum.

The cavity 66 extends across the width of the block member 10 and includes surfaces 76 and 78 which are inclined with respect to the direction of light beam propagation illustrated by the arrow 79, FIG. 3. These surfaces are smooth and preferably polished and their shape and smooth surfaces cause reflection and collimation of the light rays and projection of these rays through the large aperture 65a formed in said guide plate 65 and towards a circular shaped glass plate 80 that is supported on the lower block member. The plate 80 is mounted in a suitable recess formed in member 12 so that the upper plate surface is coplanar with the adjacent surfaces of said block member 12. A formed plate 39a, FIG. 3, partially surrounding roller 36, is also mounted on the lower block member 12 and is positioned so that its upper surface is substantially coextensive with the adjacent upper surfaces of said plates 26 and 80 so as to thereby establish a smooth composite continuous guide surface at the lower side of said channel or passage 34.

The light transmission detection means comprises a gathering and reflective means 84, FIG. 3, having a parabolically shaped reflecting surface 84a having an optical focal point 86, and a photodetector means 93 positioned at the said focal point 86, these elements being disposed in a cavity 87 formed in member 12. Cavity 87 is cylindrical in shape and is generally aligned with the said aperture 65a in plate 65 and the said cavity 66 formed in the upper member 10, the diameter of the circular aperture 65a being somewhat greater than that for the cylindrical cavity 87. The cavity 87 includes an annular shoulder 88 which acts as a positioning seat for a spider assembly 90. The spider assembly comprises a thin walled small diametered circular ring 91, FIGS. 3 and 7, that is formed with a plurality of radially disposed thin walled integral arms 92 the outer ends of which engage said shoulder 88. The photodetector means 93 which is mounted within the central ring 91 comprises, for example, a phototransistor having leads (not shown) which are suitably coupled to electrical terminals 99, FIGS. 1 and 3, on the member 10. A spacer ring 97 abuts against the lower outer edges of spider arms 92 to separate said arms from the peripheral portions of the reflective means 84; the latter being secured to the lower block member 12 by any suitable means such as screw and bracket means illustrated at 98 of FIG. 3.

Figure 7:
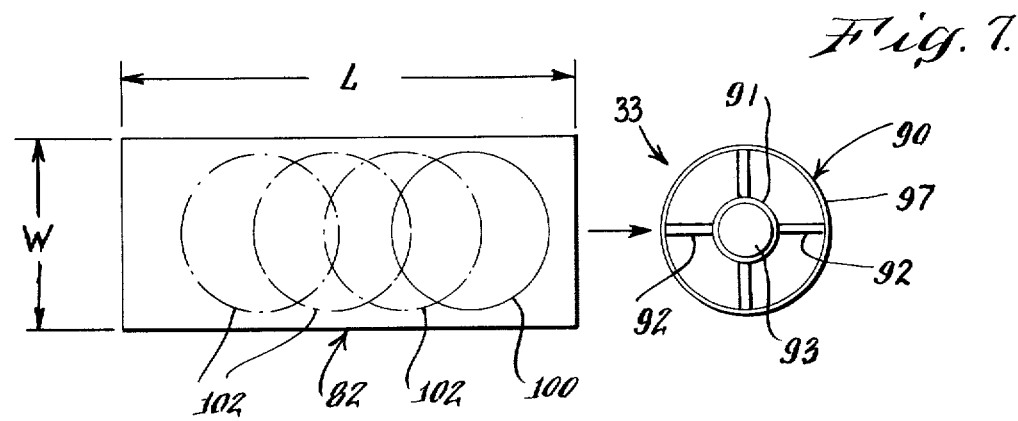
FIG. 7 is a view of an article being examined and illustrates an area on the article which is examined at any one instant of time by the apparatus.

Since the described arrangement for detecting light transmissivity provides for optical integration through the use of a light gathering reflective means, the light beam can advantageously be made incident on the article over a relatively large area of the article. This area of projection is determined principally by the cross sectional dimensions of the cavity 66 and the diameter of said aperture 65a. The polished surfaces 76 and 78 are adapted to cause reflection and collimation of the light beam which is projected over an area slightly greater than the circular cross sectional area of the bore 87 so that the bore thereby masks the fringes of the area of projection. The light gathering means 84, 84a collects and integrates the intensity of that light which is transmitted by the article into the bore 87. A circular area 100 in FIG. 7 illustrates a circular examination area which extends over a major poriton of one dimension of the article, as for example the width W of a bill 82. Integration along the entire length L of the bill 82 is effected electrically by continuously advancing the bill past the examination station 33 and electrically integrating the output of the photoconductor over the length of the article. The dot-dashed line circles 102 in FIG. 7 illustrate the effective advancement of the bill past the scanning or examination station 33 and indicate how a major portion of the bill is scanned by transporting the article past the scanning station.

Figure 8:
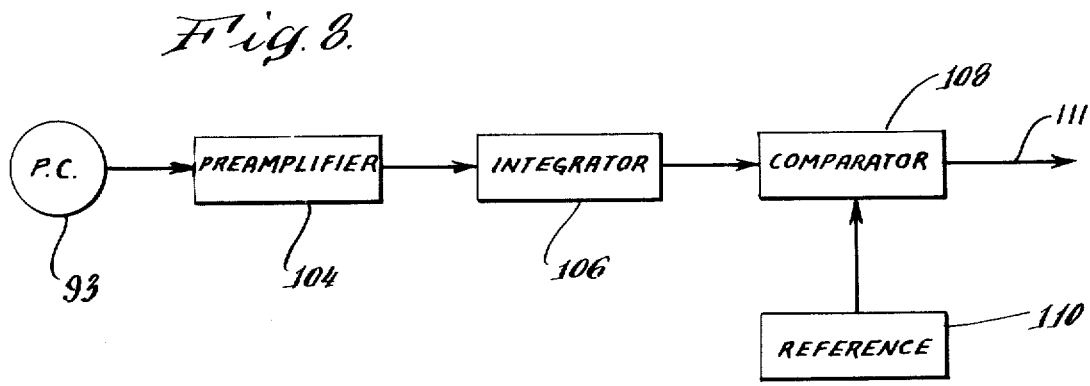
FIG. 8 is a block diagram of an electrical circuit means for use with the instant apparatus.

During transport of the bill, an electrical output signal from the photodetector means 93 is integrated to provide an electrical output signal which is representative of the light transmissivity of the article over a substantially large surface of the article. An output signal from the photoconductive means is applied to a preamplifier 104, FIG. 8, and to a suitable integrating circuit 106. The integrating circuit comprises, for example, an operational amplifier which is coupled as an integrator. The output of the integrator is applied to a comparator circuit 108 along with a reference signal from a reference signal source 110. The comparator circuit 108 provides an output signal 111 indicative of whether the integrated signal, over the length of the article, is greater than or less than the reference signal and therefore whether the article complies with a predetermined standard which is related to a characteristic of the article. The operative characteristic, in currency examination, comprises the level of transmissivity corresponding to the fitness or unfitness of the currency for continued circulation. A system employing the apparatus of this invention for determining fitness and unfitness is described and claimed in copending U.S. patent application Ser. No. (B-129) which is filed concurrently herewith and which is assigned to the assignee of this invention.

Figure 9:
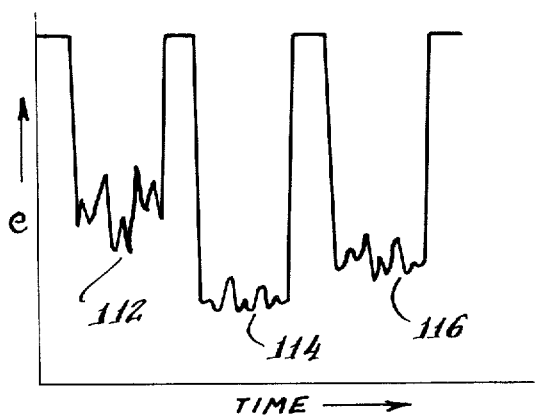
FIG. 9 is a diagram illustrating electrical wave forms generated by the instant apparatus when currency of varying physical condition is being examined.
Figure 10:
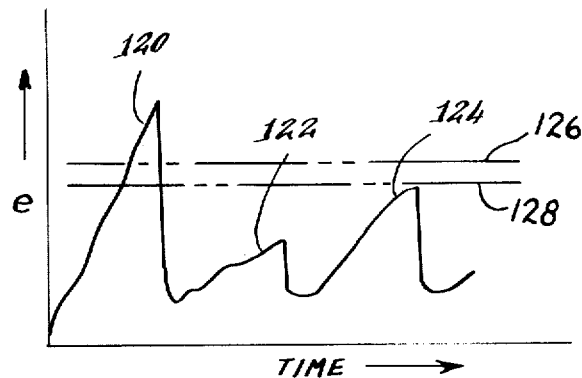
FIG. 10 is a diagram of the waveforms of the integral of the electrical signals of FIG. 9 over the length of the bill.

As illustrated in FIG. 9, a plurality of waveforms are generated in a currency fitness examination procedure wherein fit, double or overlapping bills, and unfit bills are transported and examined by this apparatus. The waveforms 112, 114 and 116 are waveforms of fit, overlapping or double, and unfit bills respectively. These signals are integrated over the length of the bill to provide output signals 120, 122 and 124 respectively as illustrated in FIG. 10. The integral of the signals over the length of the bill is compared with a reference signal level 126 which represents a level above which a bill is considered fit and below which a bill is considered unfit and with a reference level 128 below which level a bill is considered to be a double or overlapping bill.

Figure 11:
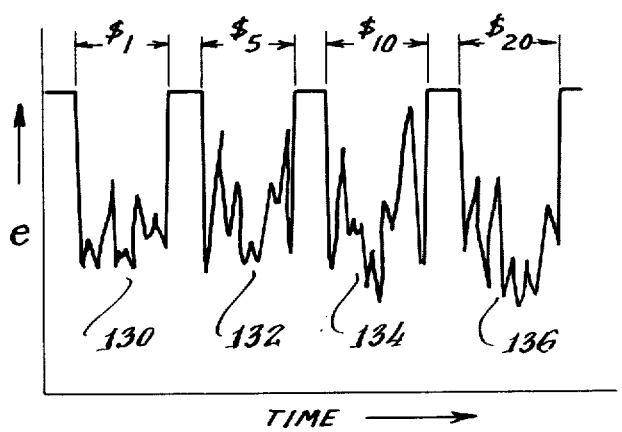
FIG. 11 is a diagram of the electrical waveforms of currency of different denominations and illustrates the distinguishing signal characteristic of each bill; and, FIG. 12 is a diagram of the waveforms of the integral of the waveforms of FIG. 11 over the length of a bill.
Figure 12:
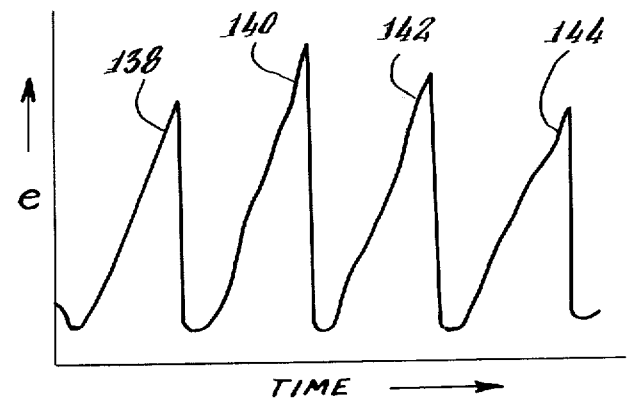

The light transmissivity detector of this invention is particularly advantageous in that it exhibits an enhanced sensitivity and resolution. I have found that upon examination with this apparatus, articles exhibit characteristic signals or "signatures" over the length of the article. These characteristic signals can be employed for distinguishing articles which have been examined and for sorting these articles. There are illustrated in FIG. 11, the waveforms 130, 132, 134 and 136 of $1, $5, $10 and $20 United States bills, respectively. These waveforms are those of bills determined to be fit for continued circulation and are shown to have characteristic peaks of differing heights and base widths. The integral of these waveforms over the length of a bill is illustrated in FIG. 12 by waveforms 138, 140, 142 and 144, respectively. The apparatus is thus advantageous in that it provides a means for examining the light transmissivity of an article over the major surface area of the article and thus provides a more accurate indication of the characteristic for which the article is being examined. In addition, the apparatus provides a light transmissivity and resolution which enables a distinguishing of different articles in the same class.

It is at times desirable to examine an article by light reflectivity in addition to, or alternatively to, the examination of the light transmissivity of the article. Referring once again to FIGS. 1 through 3, the apparatus is shown to include a plurality of light reflectivity detectors 150, 152 and 154. As best seen in FIG. 3, each detector includes a tubular shaped light hood 156 which is positioned within a bore 158 formed in the upper body member 10. The bore 158 is formed at an angle of about 45° with respect to the said glass plate 80 for gathering the maximum light which is reflected from a bill located at the station 33. A lens 160 and a photodiode 162 are mounted in the hood 156. Two stripes 164, 166, FIG. 4 of light reflective paint or the like are formed on the upper surface of block member 10, and light from lamp 64 is normally reflected by said stripes and focused by lenses 160 on the two respectively associated photodiodes 162 of units 150 and 154. In the absence of an article at the examination station 33, the reflected light causes a reference level output signal to be generated by said two photodiodes, while passage of an article through said station 33 will alter the output signal level of said photodiodes associated with all three detector units respectively and such altered signals may be utilized for related control purposes. The stripes 164, 166 are spaced apart laterally so as not to interfere with examination of the article for light transmissivity over a large surface area. A particular use of these reflectance photodetectors 150, 152, 154 for detecting demonitized bills is disclosed in the aforementioned copending U.S. patent application and hence such need not be further discussed here.

There has thus been described an improved means for the examination of the light transmissivity of an article. This means provides for scanning an article by projecting a light beam over a relatively large surface area of the article and optically integrating the light which is transmitted through the article. The light transmissivity is integrated over the length of the article to provide a relatively accurate indication of a characteristic which is related to light transmissivity. The means for determining the light transmissivity of the article exhibits enhanced sensitivity and resolution which enables the apparatus to generate identifiable electrical "signatures" for different articles of the same class. In addition to these advantageous operating characteristics, the apparatus is relatively simple and non-complex thereby enhancing the reliability of the apparatus.

While I have described a particular embodiment of my invention, it will be apparent to those skilled in the art that variations may be made therto without departing from the spirit of the invention and the scope of the appended claims.

What is claime is:

1. An optical examination apparatus for examining bills of currency: comprising
   a housing including first and second block members which are closely spaced so as to define a narrow slot-like passage through which planar articles may be conveyed;
   each of said block members having a cavity formed therein, said cavities being generally mutually aligned;
   a light source positioned in the cavity of said first block member and arranged for projecting a light beam across said passage and into the cavity of said second block member;
   a light gathering and reflective means having an optical focal point and positioned in the cavity of said second block, said light gathering and reflective means being arranged for gathering light which is projected into said second cavity and for optically integrating and reflecting said light towards said focal point;
   a photodetector;
   means mounting said photodetector in said cavity of said second block at said focal point; and
   means for transporting a planar article through said passage and between said light source and the light gathering and reflective means whereby the intensity of the light beam projected from the first to the second cavity is diminished in accordance with the light transmissivity of said article and whereby an output signal may be produced by said photodetector which is representative of the light transmissity of said article.

2. The apparatus of claim 1 wherein a bore formed in said first block member and a reflectance detector positioned in said bore, said reflectance detector comprising a hood, a photosensitive means and a lens positioned within said hood,
   said lens being adapted to focus light which is reflected from the surface of an article positioned in said passage between said cavities at said reflectance detector.

3. The apparatus of claim 2 wherein a plurality of bores are formed in said first block member and a reflectance photodetector is positioned in each bore.

4. The apparatus of claim 1 wherein said first block member is adapted for receiving a lamp which extends through said cavity in said first block member in a direction generally transverse to the direction of transport of an article through said channel, said last mentioned cavity including inclined surfaces which are adapted for reflecting light radiated from said lamp towards said cavity formed in said second block member.

5. Apparatus as defined by claim 1 additionally comprising guide means for guiding an article towards said passage; said guide means including a member having a concave surface.

* * * * *